Figure 1:
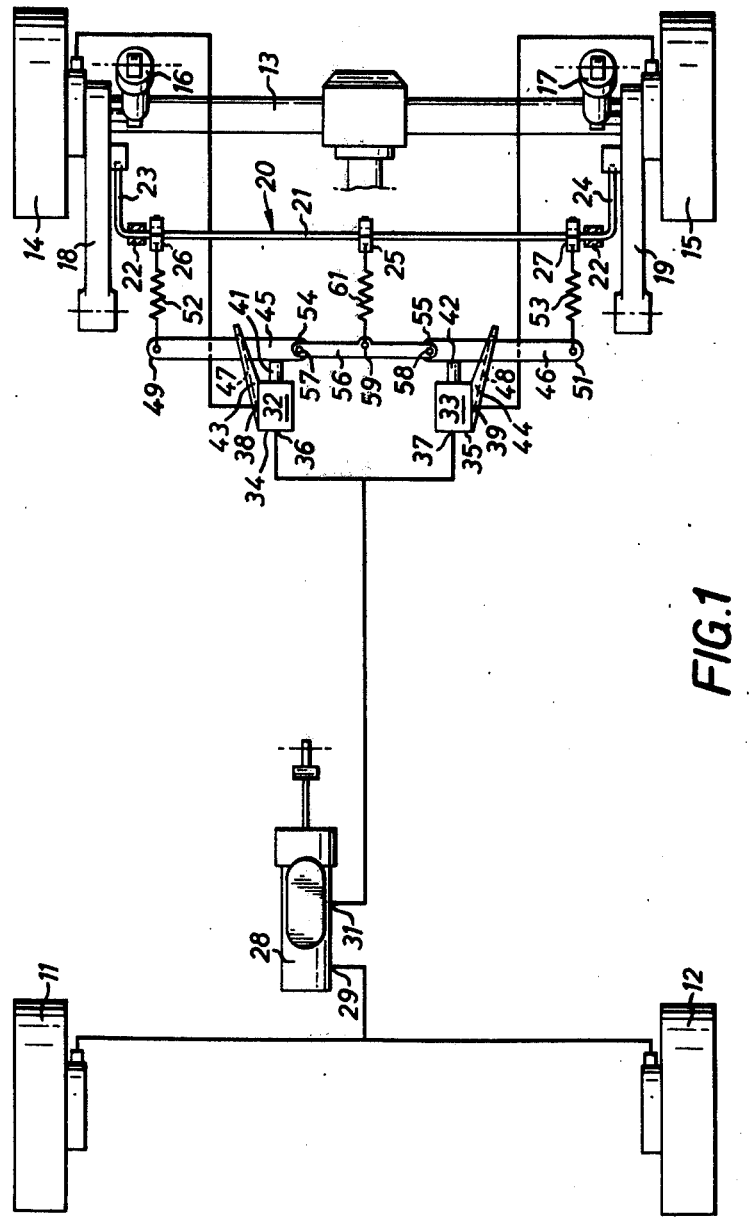

United States Patent [19]

Young

[11] 4,116,309
[45] Sep. 26, 1978

[54] FLUID PRESSURE BRAKING SYSTEMS FOR VEHICLES

[75] Inventor: Alastair John Young, Leamington Spa, England

[73] Assignee: Automotive Products Limited, Leamington Spa, England

[21] Appl. No.: 735,518

[22] Filed: Oct. 26, 1976

[30] Foreign Application Priority Data

Oct. 29, 1975 [GB] United Kingdom ............... 44740/75

[51] Int. Cl.$^2$ ............................................. B60T 8/18
[52] U.S. Cl. .................................. 188/195; 303/22 R
[58] Field of Search ....................... 188/195; 303/22 R

[56] References Cited

U.S. PATENT DOCUMENTS

| 3,695,735 | 10/1972 | Guettier ............................... 188/195 |
| 3,866,984 | 2/1975 | Seip ...................................... 188/195 |
| 3,932,002 | 1/1976 | Komoda et al. .................... 303/22 R |
| 3,977,735 | 8/1976 | Bush .................................... 188/195 |

FOREIGN PATENT DOCUMENTS

| 659,855 | 1/1964 | Italy ........................................ 188/195 |
| 2,503,160 | 7/1975 | Fed. Rep. of Germany ........ 303/22 R |

Primary Examiner—Edward R. Kazenske
Attorney, Agent, or Firm—Kemon and Estabrook

[57] ABSTRACT

Three forms of control mechanism are disclosed for controlling the biassing load exerted on the valve members of each pressure regulator of a liquid pressure braking system which includes one such pressure regulator for controlling the brake pressure on a rear wheel on one side of the vehicle and another such pressure regulator for controlling the brake pressure on the other side of the vehicle. Each of the three control mechanisms conveniently is shown connected between trailing rear suspension arms on opposite sides of the vehicle, so that it responds to vertical movements of the rear wheels relative to the vehicle body on both sides of the vehicle, and includes a lever arrangement which responds to such vertical movements of the rear wheels relative to the vehicle body on both sides of the vehicle in such a way that the proportional changes in the biassing loads applied to the valve members of the pressure regulators that follow movements of the rear wheels relative to the vehicle body are greater when those movements are unequal than when the rear wheels move relative to the vehicle body substantially equally in both magnitude and direction.

19 Claims, 3 Drawing Figures

FLUID PRESSURE BRAKING SYSTEMS FOR VEHICLES

This invention relates to fluid pressure braking systems for vehicles including a driver operable brake application control device for controlling the supply of fluid pressure to motor cylinders in which fluid pressure acts to apply brakes to wheels of the vehicle, the brake application control device being connected through a fluid pressure control valve to each motor cylinder in which fluid pressure acts to supply a brake to each rear wheel of the vehicle, the fluid pressure control valve including a valve body and a valve plunger, one of the valve body and the valve plunger being mounted upon the vehicle body and the other of the valve body and the valve plunger being connected to a component of the vehicle suspension system which moves with up and down movement of the rear wheels relative to the vehicle body so that the said other of the valve body and the valve plunger is subjected to a biasing load which varies with changes in the load borne by the rear wheels of the vehicle, the action of the biassing load upon the valve body or the valve plunger being opposed by the action upon that valve body or valve plunger of fluid pressure downstream of the fluid pressure control valve so that, once the fluid pressure downstream of the fluid pressure control valve has been increased to a certain pressure which is dependent upon the magnitude of the biassing load that acts upon the valve body or the valve plunger of that fluid pressure control valve, the fluid pressure control valve functions to prevent the fluid pressure downstream of the valve being increased further at the same rate as the fluid pressure that is transmitted to that valve by the driver operable brake application control device so that the fluid pressure downstream of the fluid pressure control valve is less than the fluid pressure upstream of it.

Provision of the fluid pressure control valve in a fluid pressure braking system of the kind referred to above compensates satisfactorily for the various situations in which the loading on the rear wheels of the vehicle is changed substantially uniformly; for example when the static loading of the vehicle is changed, when the brakes are applied whilst the vehicle is travelling in a straight line which causes a substantially evenly distributed dynamic load transfer from the rear wheels to the front wheels, or under the so-calld "bounce" conditions when up and down movement of the rear wheels of the vehicle relative to the vehicle body is substantially the same.

It has been proposed that the brake application control device be connected to the or each motor cylinder in which fluid pressure acts to apply a brake to the rear wheel or group of rear wheels of a vehicle on one side of the vehicle through one such fluid pressure control valve and to the or each motor cylinder in which fluid pressure acts to apply a brake to each rear wheel or group of rear wheels of the vehicle on the other side of the vehicle through another such fluid pressure control valve. In accordance with this proposal the valve body of each fluid pressure control valve would be mounted upon one of the vehicle body and a component of the vehicle suspension system which moves with up and down movement of the respective rear wheel or group of rear wheels relative to the vehicle body and the valve plunger of that fluid pressure control valve would be connected to the other of the vehicle body and that suspension system component. Hence the valve plunger of each fluid pressure control valve would be subjected to a biassing load which varies with changes in the load borne by the respective rear wheel or group of rear wheels that is on the respective side of the vehicle. The object of this proposal was to provide compensation for the conditions that are established when the vehicle body rolls about its longitudinal axis, such as occurs when the vehicle is cornering and the rear wheels on opposite sides of the vehicle are loaded unevenly due to a dynamic load transfer from the inboard rear wheel to the outboard rear wheel, in addition to providing compensation for the various load change conditions referred to above in which the load change is distributed substantially evenly between the rear wheels of the vehicle. However we have found that in a vehicle, for example a vehicle which is fitted with an anti-roll bar at the rear of the vehicle, in which the movement of the vehicle body relative to the rear wheels of the vehicle that accompany a given change in the load borne by those rear wheels when the vehicle body rolls about its longitudinal axis are less than the movement of that vehicle body relative to those rear wheels that accompanies the same change in the load borne by those rear wheels under the so-calld "bounce" condition or similar condition when the loading on the rear wheels is changed substantially equally, if the means for varying the biassing load that acts upon the valve plunger of each fluid pressure control valve are arranged so that that biassing load is varied solely in response to up and down movement of the respective rear wheel of the vehicle, or of a component of the vehicle suspension system which moves with up and down movement of the respective rear wheel relative to the vehicle body, the resultant change in the brake pressure on each rear wheel for a given change in the load borne by that rear wheel under the so-called "bounce" condition or similar conditions when the loading on the rear wheels is changed substantially equally is not the same as the change in the brake pressure on each rear wheel that follows from a change in the loading on that rear wheel of a similar magnitude under conditions when the vehicle body rolls about its longitudinal axis, although ideally the change in the brake pressure on each rear wheel should be the same for a given change in the load borne by that wheel under all conditions whether it be due to rolling of the vehicle body or bounce or some other condition when the change in the load borne by the rear wheels of the vehicle on each side of the vehicle is substantially the same.

An object of this invention is to provide a fluid pressure braking system for a vehicle which includes one fluid pressure control valve for controlling the brake pressure that is applied to a rear wheel or group of rear wheels on one side of the vehicle and which responds to a change in the loading on that rear wheel or group of rear wheels in order to effect a corresponding change in the brake pressure on that rear wheel or group of rear wheels of the vehicle, and another fluid pressure control valve for controlling the brake pressure that is applied to the other rear wheel or group of rear wheels on the other side of the vehicle and which is operable in response to a change in the loading on that other rear wheel or group of rear wheels on the other side of the vehicle in order to effect a corresponding change in the brake pressure that acts upon that other rear wheel or group of rear wheel on the other side of the vehicle.

According to this invention there is provided a fluid pressure braking system for a vehicle which comprises a body and a suspension system by which the body is supported upon the wheels of the vehicle, the fluid pressure braking system including a driver operable brake application control device for controlling the supply of fluid pressure to motor cylinders in which fluid pressure acts to apply brakes to wheels of the vehicle, the brake application control device being connected to the or each motor cylinder in which fluid pressure acts to apply a brake to the or each rear wheel on one side of the vehicle through one fluid pressure control valve and to the or each motor cylinder in which fluid pressure acts to apply a brake to the or each rear wheel on the other side of the vehicle through another fluid pressure control valve, each fluid pressure control valve including a valve body and a valve plunger, one of the valve body and the valve plunger of each fluid pressure control valve being connected to the vehicle body, and a control mechanism for each fluid pressure control valve, each such control mechanism including resilient means which are associated with the other of the valve body and the valve plunger of the respective fluid pressure control valve and with a component of the suspension system which moves with up and down movement of the respective rear wheel or group of rear wheels relative to the vehicle body in such a way that, due to the action of said resilient means, the said other of the valve body and the valve plunger of the respective valve is subjected to a biassing load which varies with changes in the load borne by the respective rear wheel, or group of rear wheels, the action of the biassing load upon the valve body or the valve plunger of each fluid pressure control valve being opposed by the action upon that valve body or valve plunger of fluid pressure downstream of the respective fluid pressure control valve so that, once the fluid pressure downstream of each fluid pressure control valve has been increased to a certain pressure which is dependent upon the magnitude of the biassing load that acts upon the valve body or the valve plunger of that fluid pressure control valve, that valve functions to prevent the fluid pressure downstream of the valve being increased further at the same rate as the fluid pressure that is transmitted to that valve by the driver operable brake application control device so that the fluid pressure downstream of that valve is less than the fluid pressure upstream of it, wherein the control mechanism for each fluid pressure control valve also includes leverage means upon which the resilient means act and by which the biassing load is applied to the said other of the valve body and the valve plunger of the respective fluid pressure control valve, the leverage means of the two control mechanisms being interconnected so that they interact with one another with the result that, due to the lever effect of the respective leverage means, proportional changes in the biassing loads that act upon the valve bodies or the valve plungers of the two fluid pressure control valves are greater than the proportional changes in the loading of the respective resilient means that follow movements of the rear wheels or groups of rear wheels on opposite sides of the vehicle relative to the vehicle body which are unequal in either magnitude or direction, whereas the proportional changes in the biassing loads that act upon the valve bodies or the valve plungers of the two fluid pressure control valves that follow movements of the respective rear wheels or groups of rear wheels on opposite sides of the vehicle relative to the vehicle body which are substantially the same in both magnitude and direction are substantially equal to the proportional changes in the loading of the resilient means that follow such movements of the rear wheels or groups of rear wheels, or are greater than such proportional changes in the loading of the resilient means by a factor which is smaller than the factor that apertains when the movements of the rear wheels or groups of rear wheels on opposite sides of the vehicle relative to the vehicle body are unequal so that the resultant changes in the biassing loads that act upon the valve bodies or the valve plungers of the two fluid pressure control valves are less than they would have been if the movements of the respective rear wheels or groups of rear wheels on opposite sides of the vehicle relative to the vehicle body had been unequal in either magnitude or direction.

The term "proportional change" as applied to a change in the magnitude of a force is used in this specification to mean the ratio between the magnitude of a change in a force and the magnitude of the force that is changed.

Preferably the two control mechanisms are interconnected by a single beam, part of the beam forming at least part of the leverage means of one of the control mechanisms and the remainder of the beam forming at least part of the leverage means of the other control mechanism, the arrangement being such that the two parts of the beam are loaded substantially equally and in the opposite sense so that the beam is rotated about an axis which passes through the junction of the two parts of the beam and the biassing load that acts upon the said other of the valve body and the valve plunger of each fluid pressure control valve is changed accordingly when the vehicle body rolls about its longitudinal axis, and the two parts of the beam are loaded substantially equally and in the same sense so that the whole beam is moved laterally and the biassing load on each of the two valve plungers is changed accordingly when the rear wheels, or groups of rear wheels on opposite sides of the vehicle move substantially equally and in the same sense relative to the vehicle body.

The control mechanism for each fluid pressure control valve may include a torsion bar which is connected at one end to the respective suspension system component, interconnecting means which interconnect the ends of the two torsion bars that are remote from the respective vehicle suspension system components and which comprise said bean and connecting means by which each torsion bar is connected to the beam directly, or via an intermediate lever which forms part of the interconnecting means, the connecting means comprising a spaced pair of hinged joints on the beam, each torsion bar being connected to a respective one of the spaced pair of hinged joints, the fluid pressure control valves being orientated symmetrically with respect to the beam with the said other of the valve body and the valve plunger of each valve being adapted to be abutted by a respective part of the interconnecting means such as the beam or the respective intermediate lever, where such a lever is provided, the arrangement being such that the two torsion bars are loaded angularly and substantially equally in the opposite senses when the vehicle body rolls about its longitudinal axis, and the two torsion bars are loaded angularly substantially equally in the same sense when the rear wheels, or groups of rear wheels on opposite sides of the vehicle move substantially equally and in the same sense relative to the vehicle body.

Where each torsion bar is connected to the beam via a respective intermediate lever, the two torsion bars together may comprise an anti-roll bar of the vehicle. The anti-roll bar may carry three spaced radial arms, the central radial arm being connected to the centre of the beam and each of the outer radial outer arms being connected to the end of the respective intermediate lever remote from the beam, each intermediate lever being supported upon a respective fulcrum which is fixed with respect to the one of the valve body and the valve plunger of the respective fluid pressure control valve that is connected to the vehicle body, the other of the valve body and the valve plunger of that fluid pressure control valve being adapted to engage the intermediate lever between the respective fixed fulcrum and the respective hinge connection to the beam. Each of the outer radial arms may be connected to the respective intermediate lever via a respective tension spring. The central radial arm may be connected to the centre of the beam via a respective tension spring.

The action of the resilient means of each control mechanism upon the beam may be opposed by the action of at least one spring upon that beam, said at least one spring reacting against an abutment which is fixed to the vehicle body. Preferably there are two such springs which are aligned coaxially each with a respective one of the said others of the two valve bodies and valve plungers which are connected to spaced points on the beam by suitable hinge connections. Conveniently each such spring is a compression spring which acts upon the side of the beam opposite that to which the said others of the valve bodies and the valve plungers are connected. The resilient means of each control mechanism may comprise a tension spring, the action of that tension spring being applied to the respective end of the beam through a respective lever which is fulcrumed about a pivot which is fixed to the vehicle body. Preferably each such lever is arranged so that the force it applies to the respective end of the beam is greater than the loading of the respective tension spring.

Figure 2:
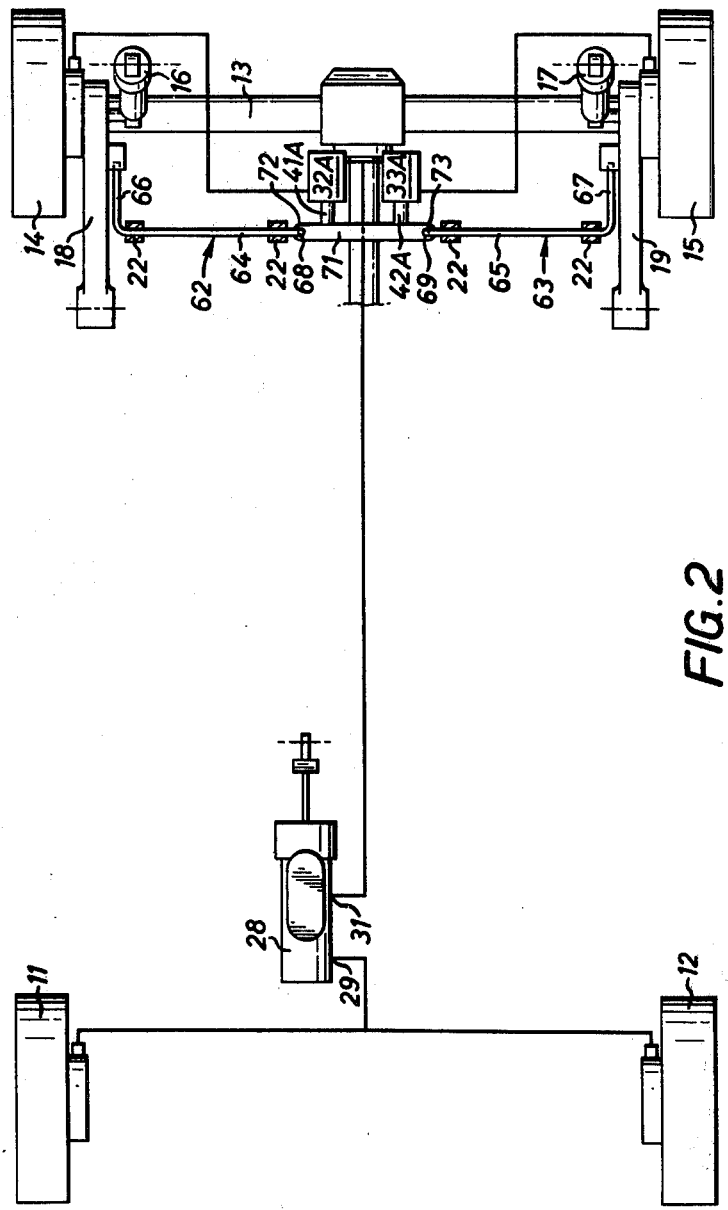
Figure 3:
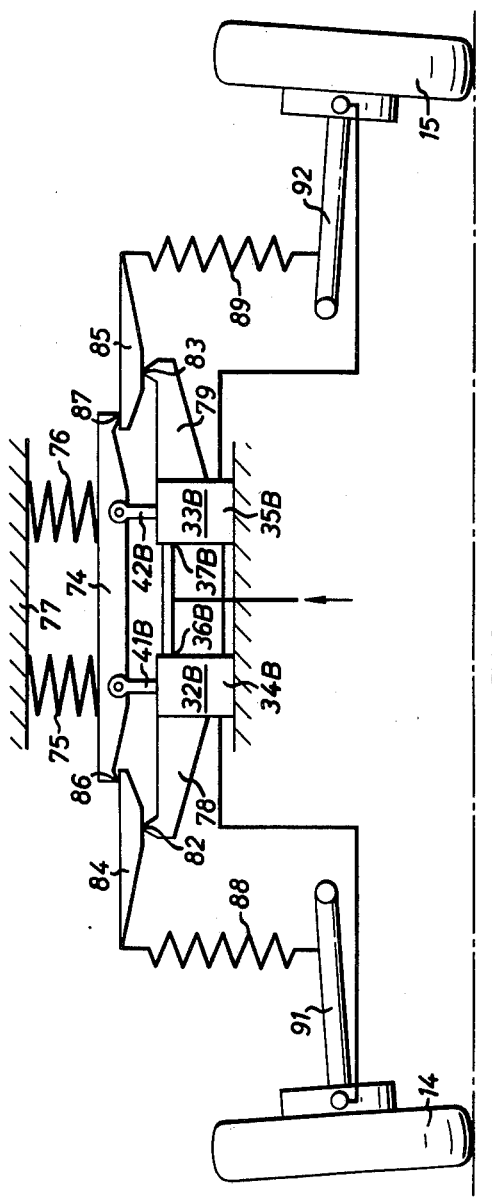

Three embodiments of this invention will be described now by way of example with reference to the accompanying drawings of which:

FIG. 1 is a diagrammatic representation of one form of liquid pressure braking system for a vehicle in which this invention is embodied, the wheels and part of the rear suspension system of the vehicle including an anti-roll bar, being shown in plan;

FIG. 2 is a diagrammatic representation similar to FIG. 1 of another form of liquid pressure braking system for a vehicle in which this invention is embodied, the control mechanism being independent of the anti-roll bar of the vehicle; and FIG. 3 is a diagram which illustrates a further form of control mechanism which is for controlling the operation of pressure reducing valves that control liquid pressure that acts to apply brakes to rear wheels of a vehicle which is not fitted with an anti-roll bar.

FIG. 1 shows a pair of front wheels 11 and 12, a rear axle 13 with a rear wheel 14, 15 at either end, a pair of suspension struts 16 and 17 and a pair of trailing suspension arms 18 and 19 which support the body (not shown) of a vehicle in a conventional manner. Each suspension strut 16, 17 and trailing suspension arm 18, 19 is connected to the hub of a respective one of the rear wheels 14 and 15 so that the suspension arm 18, 19 swings relative to the body with relative vertical movement between the respective rear wheel 14, 15 and the body. The vehicle has an anti-roll bar 20 which comprises a central rod 21, which is supported by spaced bearing supports 22 for angular movement about its own longitudinal axis, and a pair of end arms 23 and 24. A central radial arm 25 is fixed to the central rod portion 21 at its centre midway between a pair of outer radial arms 26 and 27 which are fixed to the central rod portion 21 also, each being adjacent a respective one of the spaced bearing supports 22. The spaced bearing supports 22 support the anti-roll bar 20 at the rear of the vehicle and are mounted upon the vehicle body. The outer end of the end arm 23 of the anti-roll bar 20 is fixed to the trailing suspension arm 18 and the other anti-roll bar end arm 24 is fixed to the trailing suspension arm 19. The two end arms 23 and 24 project in the same direction each from a respective end of the central rod portion 21 and at right angles to the longitudinal axis of that rod portion 21 when the vehicle is at rest upon a flat surface and the vehicle body is supported by the wheels 11, 12, 14 and 15 of the vehicle.

The vehicle is provided with a liquid pressure braking system which includes the usual driver operable brake application control device that is operable ty the driver of the vehicle to transmit liquid pressure to motor cylinders in which that liquid pressure acts to apply brakes to wheels 11, 12, 14 and 15 of the vehicle. For the sake of convenience of the driver operable brake application control device is shown to be a liquid pressure tandem master cylinder 28 having two liquid pressure outlets 29 and 31 which are in conduit communication respectively with the motor cylinders that are operable to apply brakes to the front wheels 11 and 12 and with the motor cylinders that are operable to apply brakes to the rear wheels 14 and 15. Alternatively the driver operable brake application control device may be a pedal valve which is operable to connect the motor cylinders selectively to a source of liquid pressure that is available continuously whenever the engine of the vehicle is in operation, or to a low pressure liquid reservoir.

Liquid pressure that is transmitted by the tandem master cylinder 28 to the motor cylinder (not shown) that operates to apply a brake to the rear wheel 14 is fed through a liquid pressure reducing valve 32 and liquid pressure that is transmitted by the tandem master cylinder 28 to the motor cylinder (not shown) that operates to apply a brake to the other rear wheel 15 is fed through another liquid pressure reducing valve 33.

Each liquid pressure reducing valve 32, 33 comprises a valve body 34, 35 which is mounted upon the body of the vehicle, a liquid pressure inlet 36, 37 which is in conduit communication with the respective liquid pressure outlet 31 of the tandem master cylinder 28, a liquid pressure outlet 38, 39 which is in conduit communication with the respective motor cylinder in which liquid pressure acts to apply the brake to the rspective rear wheel 14, 15, and a differential area valve plunger 41, 42 which has its larger effective area (not shown) exposed to liquid pressure at the outlet 38, 39 of the respective liquid pressure reducing valve 32, 33 and its smaller effective area (not shown) exposed to liquid pressure at the inlet 36, 37 of the respective liquid pressure reducing valve 32, 33. The differential liquid pressure loading on each differential area valve plunger 41, 42 tends to seat the valve plunger 41, 42 on a valve seat (not shown) within the respective valve body 34, 35 so as to close communication between the inlet (36, 37) and the outlet 38, 39 of the respective liquid pressure reducing valve 32, 33. The valve plunger 41, 42 of each liquid pressure reducing valve 32, 33 projects outwardly through an aperture in the respective valve body 34, 35.

The two liquid pressure reducing valves 32 and 33 are mounted upon the body of the vehicle with the axes of their valve plungers 41 and 42 parallel to the longitudinal axis of the vehicle about which they are disposed symmetrically. The valve plungers 41 and 42 extend towards the anti-roll bar 20. Each liquid pressure reducing valve 32, 33 has a support plate 43, 44 which projects from the outer edge of the valve body 34, 35 of that valve 32, 33 towards the anti-roll bar 20. The two valve plungers 41 and 42 are between the two support plates 43 and 44 and are adapted to be urged into abutment with a respective actuator lever 45, 46 by the differential liquid pressure loading that acts upon them. Each actuator lever 45, 46 projects through a respective aperture 47, 48, in the respective support plate 43, 44 and is fulcrumed about a pivot within that aperture 47, 48 for pivotal movement within that aperture 47, 48. The outer end 49, 51 of each actuator lever 45, 46 is connected to the respective outer radial arm 26, 27 by a respective tension spring 52, 53. The inner ends 54 and 55 of the two actuator levers 45 and 46 are interconnected by a beam 56, each inner lever end 54, 55 being hinged to the respective end 57, 58 of the beam 56. The centre 59 of the beam 56 is connected to the central radial arm 25 by a third tension spring 61.

The configuration of the anti-roll bar 20, the tension springs 52, 53 and 61, the two actuator levers 45 and 46, the beam 56 and the two liquid pressure reducing valves 32 and 33 is symmetrical about the longitudinal centre line of the vehicle when the vehicle is at rest upon a flat surface with the vehicle body supported by the wheels 11, 12, 14 and 15 of the vehicle. The apparatus is assembled upon the vehicle so that a biasing load is applied to the valve plunger 41, 42 of each liquid pressure reducing valve 32, 33 by the respective actuator lever 45, 46 due to the action of the respective tension spring 52, 53 upon that actuator lever 45, 46. The biassing load that acts upon the valve plunger 41, 42 of each liquid pressure reducing valve 32, 33 holds that valve plunger 41, 42 unseated when the liquid pressure braking system is inoperative so as to permit the transmission of liquid pressure from the liquid pressure inlet 36, 37 to the liquid pressure outlet 38, 39 through the respective valve body 34, 35 when the tandem master cylinder 28 is operated initially to apply the brakes.

When the tandem master cylinder 28 is operated by the driver to apply the brakes, liquid pressure is transmitted through each liquid pressure reducing valve 32, 33 to the respective motor cylinder in which that liquid pressure acts to apply brakes to the respective rear wheel 14, 15. The liquid pressure loading on the valve plunger 41, 42 of each liquid pressure reducing valve 32, 33 acts in opposition to the biassing load that is exerted upon that valve plunger 41, 42 via the respective actuator lever 45, 46 and is increased as the liquid pressure that is transmitted by the tandem master cylinder 28 is increased. When the liquid pressure loading on the valve plunger 41, 42 has been increased to the value at which it balances the biassing load on that valve plunger 41, 42, the valve plunger 41, 42 seats to close communication between the inlet 36, 37 and the outlet 38, 39 of that liquid pressure reducing valve 32, 33. A further increase in liquid pressure transmitted by the tandem master cylinder 28 acts upon the smaller effective area of the valve plunger 41, 42 of the liquid pressure reducing valve 32, 33 that is closed and unseats the respective valve plunger 41, 42 in order to increase the liquid pressure at the outlet 38, 39 of the respective liquid pressure reducing valve 32, 33. The valve plunger 41, 42 of that liquid pressure reducing valve 32, 33 reseats before the liquid pressure at the outlet 38, 39 of that liquid pressure reducing valve 32, 33 has been increased to the pressure of liquid at the inlet 36, 37 of that liquid pressure reducing valve 32, 33 so that the liquid pressure in the motor cylinder that is connected to the outlet 38, 39 of that respective liquid pressure reducing valve 32, 33 increases at a rate which is lower than the rate of increase of liquid pressure that is transmitted by the tandem master cylinder 28 once the valve plunger 41, 42 of the respective liquid pressure reducing valve 32, 33 has seated initially.

The pressure of liquid at which the valve plunger 41, 42 of each liquid pressure reducing valve 32, 33 seats initially is dependent upon the load that is borne by the respective rear wheel 14, 15 of the vehicle and thus upon the relative position of the vehicle body and the trailing suspension arm 18, 19 to which the respective end arm 23, 24 of the anti-roll bar 20 is fixed. If the load borne by the rear wheels 14 and 15 changes substantially equally and in the same sense so that the two anti-roll bar end arms 23 and 24 pivot together by equal amounts in the same sense about the longitudinal axis of the central anti-roll bar rod portion 21, the three radial arms 25, 26 and 27 also rotate in he same sense about the longitudinal axis of the central anti-roll bar rod portion 21. Consequently the three tension springs 52, 53 and 61 are flexed equally, either being extended or contracted by equal amounts, so that the forces that act upon the two actuator levers 45 and 46 and the force that acts on the central beam 56 are changed equally. The change in the load that is exerted upon the beam 56 by the central tension spring 61 is distributed evenly between the ends 57 and 58 of the beam 56 and acts to counter the change in the load that is exerted upon the outer end 49, 51 of each actuator lever 45, 46 by the respective outer tension spring 52, 53. The change in the load that is exerted upon the outer end 49, 51 of each actuator lever 45, 46 is substantially twice the change in the force that acts upon the inner end 54, 55 of that actuator lever 45, 46 so that that actuator lever 45, 46 pivots about its fulcrum in the aperture 47, 48 of the respective support plate 43, 44 and changes the biassing load that is applied to the respective valve plunger 41, 42 by that actuator lever 45, 46. HencE the biassing loads that act upon the two valve plungers 41 and 42 are changed equally, either being increased or decreased, so that the liquid pressure at which each valve plunger 41, 42 seats initially is either increased or decreased, being changed in accordance with the change in the load borne by the respective rear wheel 14, 15 of the vehicle. The proportional change in the biassing load that acts upon each of the two valve plungers 41 and 42, that is to say the ratio between the change in that biassing load and the magnitude of that biassing load before the change, that follows a change in the load that in borne by the respective wheel 14, q15 is substantially equal to the proportional change in the load that is borne by that wheel 14, 15.

If the vehicle is driven around a bend so that the vehicle body rolls about the longitudinal centre line of the vehicle, the loading on the inboard wheels of the vehicle is reduced and the loading on the outboard wheels of the vehicle is increased due to the influence of centrifugal force and the consequent dynamic load transfer from the inboard wheels to the outboard wheels. When such load transfer occurs, the outer end arms 23 and 24 of the anti-roll bar 20 are rotated by substantially equal amounts about the longitudinal axis of the central rod portion 21 of the anti-roll bar 20, but in opposite senses, the inboard of the two end arms 23, 24 effectively being urged upwards with respect to the adjacent rear wheel 14, 15 of the vehicle, whilst the other end arm 23, 24 effectively is urged downwards with respect to the adjacent rear wheel 14, 15 of the vehicle. Consequently the two outer radial arms 26 and 27 are moved substantially equally in opposite directions whilst the central radial arm 25 remains substantially stationary. Hence the tension spring 52, 53 that is connected to the outboard radial arm 26, 27 is extended so that the load it exerts upon the outer end 49, 51 of the respective actuator lever 45, 46 is increased, whilst the other outer tension spring 52, 53 is allowed to contract and the load it exerts upon the outer end 49, 51 of the other actuator lever 45, 46 is reduced. Consequently each lever 45, 46 pivots about the respective fulcrum and the ends 57 and 58 of the beam 56 move with the consequent movement of the inner ends 54 and 55 of the actuator levers 45 and 46 so that the beam 56 rotates idly about its centre 59. The lever action of the actuator levers 45 and 46 leads to the resultant change in the biassing load that acts upon the respective valve plunger 41, 42, being greater than the change in the loading of the respective outer tension spring 51, 52, be it a decrease in that biassing load which is the case with the valve plunger 41, 42 of the liquid pressure reducing valve 32, 33 that controls liquid pressure that acts in the motor cylinder that operates to apply a brake to the inboard rear wheel 14, 15 of the vehicle, or an increase in the biassing load that acts upon the valve plunger 41, 42 of the other liquid pressure reducing valve 32, 33.

The lever effect of the actuator levers 45 and 46 is greater when the vehicle body rolls about its longitudinal centre line relative to the wheels of the vehicle than it is when the rear wheels 14 and 15 move substantially equally and in the same sense with respect to the vehicle because the central tension spring 61 does not have a significant influence upon the change in the forces that act upon each of the actuator levers 45 and 46 in the former situation whereas it acts to oppose the action of the two outer tension springs 52 and 53 in the latter situation. Hence the proportional change in the biassing load that acts upon each of the two valve plungers 41 and 42 is greater than the proportional change in the load that is borne by the respective rear wheel 14, 15 that it follows. Thus the provision of the central tension spring 61 which acts to oppose the action of the outer tension springs 52 and 53 only when the rear wheels 14 and 15 move substantially equally and in the same sense relative to the vehicle body compensates for the fact that due to the action of the anti-roll bar 20 which acts to minimise rolling movement of the vehicle body relative to the rear wheels 14 and 15, up and down movement of a rear wheel 14, 15 relative to the vehicle body is less when the vehicle body rolls about the longitudinal centre line of the vehicle than it is when the movement of the rear wheels 14 and 15 relative to the vehicle body is substantially the same and in the same sense for the same change in the loading on the rear wheels 14 and 15.

It is not essential for the radial arms 25, 26 and 27 to which the tension springs 52, 53 and 61 are connected to be fixed to the anti-roll bar 20. They may be fixed to a simple torsion bar having a central rod portion and a pair of end arms which extend at right angles to the longitudinal axis of the central rod portion and which is supported upon the vehicle body by spaced supports like the spaced supports 22 so that the central rod portion extends from side to side of the vehicle parallel to the central rod portion 21 of the anti-roll bar 20 of the vehicle.

FIG. 2 illustrates another arrangement for controlling operation of liquid pressure reducing valves 32A and 33A through which liquid pressure is transmitted from the tandem master cylinder 28 to the motor cylinders in which liquid pressure acts to apply brakes to the rear wheels 14 and 15 and which is not connected directly to the anti-roll bar (not shown) that is fitted to the vehicle. Those parts shown in FIG. 2 which are similar to corresponding parts shown in FIG. 1 are identified by the same reference numeral. The two liquid pressure reducing valves 32A and 33A are similar in construction and operation to each of the liquid pressure reducing valves 32 and 33 that have been described above fully and each of their component parts are identified by the reference numeral that identifies the corresponding part of the valves 32 and 33 with the addition of the suffix A.

A pair of torsion bars 62 and 63 have their central rod portions 64 and 65 supported coaxially by spaced supports 22 which are mounted upon the vehicle body so that the common axis of the two central rod portions 64 and 65 extends from side to side of the vehicle. Each torsion bar 62 and 63 has an outer end arm 66, 68 and an inner end arm 68, 69. Each of the arms 66, 67, 68, 69 is normal to the longitudinal axis of the central rod portion 64, 65 of the respective torsion bar 62, 63. The outer end of each outer torsion bar end arm 66, 67 is connected to a respective one of the pair of trailing suspension arms 18 and 19 by which the vehicle body is supported upon the respective rear wheels 14, 15 of the vehicle so that each outer end arm 66, 67 moves with relative movement between the vehicle body and the respective rear wheels 14, 15. The ends of the two inner end arms 68 and 69 of the two torsion bars 62 and 63 remote from the respective central rod portions 64 and 65 are joined together by a beam 71 which is hinged at each end 72, 73 to the respective inner end arm 68, 69.

The two outer end arms 66 and 67 extend in the same direction from the respective central rod portion 64, 65 and the two inner arms 68 and 69 lie in a notional plane which is normal to the notional plane that includes the two outer end arms 66 and 67 and extend in the same direction from the respective central rod portion 64, 65 of the respective torsion bar 62, 63 when the vehicle is at rest upon a flat surface and the vehicle body is supported by the wheels 11, 12, 14 and 15 of the vehicle. Also the torsion bars 62 and 63 and the liquid pressure reducing valves 32A and 33A are arranged symmetrically about a line which passes through the centre of the beam 71 midway between the longitudinal axes of the valve plungers 41A and 42A which are parallel to that line. The valve plungers 41A and 42A of the two liquid pressure reducing valves 32A and 33A are held unseated by the beam 71 due to the action of the torsion bars 62 and 63 on the beam 71.

When the tandem master cylinder 28 is operated by the driver to apply the brakes, the differential liquid pressure loading on each of the valve plungers 41A and 42A of the two liquid pressure reducing valves 32A and 33A opposes the biasing load that is applied to that valve plunger 41A, 42A by the beam 71 due to the action of the two torsion bars 62 and 63 on the beam 71. Hence angular movement of each inner end arm 68, 69 is less than the corresponding angular movement of the respective outer end arm 66, 67 which accompanies up and down movement of the rear wheels 14 and 15 relative to the vehicle body, and probably is negligible, the difference between such angular movement of the two end arms 66 and 68, 67 and 69 of each torsion bar 62, 63 being accommodated by torsional strain of the respective central torsion bar portion 64, 65.

When the rear wheels 14 and 15 on each side of the vehicle move substantially equally and in the same sense relative to the vehicle body, the two outer torsion bar end arms 66 and 67 are rotated substantially equally and in the same sense about the common axis of the two central torsion bar rod portions 64 and 65. The resilience of the torsion bars 62 and 63 ensures that the inner end arms 68 and 69 are urged angularly in the same sense as the outer end arms 66 and 67 are moved, the two inner end arms 68 and 69 being loaded substantially equally so that the beam 71 is urged laterally with the inner end arms 68 and 69 of the two torsion bars 62 and 63 without being pivotted about is centre. Hence the biassing loads that act upon the valve plungers 41A and 42A that follows a change in the load that is borne by the respective wheel 14, 15 is substantially equal to the proportional change in the load that is borne by that wheel 14, 15.

On the other hand, if the vehicle body rolls about its longitudinal centre line and there is a dynamic load transfer from the inboard rear wheel 14, 15 to the outboard rear wheel 14, 15 the outboard outer end arm 66, 67 of the respective torsion bar 62, 63 is urged upwardly relative to the vehicle body and the inboard outer end arm 66, 67 is urged downwardly relative to the vehicle body. The beam 71 is pivotted about its centre so that the biassing load that acts upon the valve plunger 41A, 42A of the outboard of the two liquid pressure reducing valves 32A and 33A is increased whilst the biassing load that acts upon the valve plunger 41A, 42A of the inboard of the two liquid pressure reducing valves 32A and 33A is reduced.

The pivotal action of the beam 71 about is centre when the vehicle body rolls about its longitudinal centre line has a leverage effect upon the valve plungers 41A and 42A of the two liquid pressure reducing valve 32A and 33A so that the change in the biassing load that acts upon each valve plunger 41A, 42A is greater than the change in the force that is applied to the nearer end 72, 73 of the beam 71 by the respective torsion bar 62, 63. There is no such leverage effect exerted by the beam 71 upon the valve plungers 41A and 42A when the rear wheels 14 and 15 move substantially equally and in the same sense relative to the vehicle body, the beam 71 being moved laterally without any pivotal movement about its centre. Hence the change in the biassing load upon each valve plunger 41A, 42A that occurs when the vehicle body rolls about is longitudinal centre line so that forces of a given magnitude are applied in opposite directions to the ends 72 and 73 of the beam 71 by the torsion bars 62 and 63 is greater than the change in the biassing load upon that valve plunger 41A, 42A that occurs when the rear wheels 14 and 15 move substantially equally and in the same sense relative to the vehicle body and so that forces of the said given magnitude are applied to the ends 72 and 73 of the beam 71 by the torsion bars 62 and 63. Also the proportional change in the biassing load that acts upon each of the two valve plungers 41A and 42A is greater than the proportional change in the load that is borne by the respective wheel 14, 15 that is follows when the vehicle body rolls about is longitudinal centre line whereas they are substantially equal when the rear wheels 14 and 15 move substantially equally relative to the vehicle body.

FIG. 3 illustrates a further arrangement for controlling operation of liquid pressure reducing valves 32B, 33B through which liquid pressure is transmitted from the driver operable brake application control device to the motor cylinders in which liquid pressure acts to apply brakes to the rear wheels 14 and 15 of the vehicle. The apparatus illustrated in FIG. 3 is designed for use upon a motor car which is not fitted with an anti-roll bar but which has a suspension system which has characteristics which are similar to the suspension characteristics of a motor car which is fitted with an anti-roll bar, that is to say a motor car in which, for the same change in the load borne by each rear wheel, or group of rear wheels, movement of each rear wheel, or group of rear wheels relative to the vehicle body is greater under the so-called "bounce" conditions when up and down movement of the rear wheels, or groups of rear wheels relative to the vehicle body is substantially the same, than it is when the vehicle body rolls about its longitudinal axis. The basic principle of operation of the arrangement shown in FIG. 3 is similar to that of the arrangement shown in FIG. 2. The construction and operation of each of the liquid pressure reducing valves 32B and 33B is similar to the construction and operation of the liquid pressure reducing valves 32 and 33 that has been described above fully and the component parts of each of the valves 32B and 33B are identified by the same reference numerals that identify corresponding parts of the valves 32 and 33 but with addition of the suffix B.

Referring now to FIG. 3, the liquid pressure reducing valves 32B and 33B are mounted on the vehicle body and are arranged symmetrically about the longitudinal axis of the vehicle, the axes of the valve plungers 41B and 42B being parallel to each other and lying in a vertical plane which is perpendicular to that longitudinal axis. The outer end of each valve plunger 41B, 42B is connected to a beam 74. Each end of the beam 74 is spaced from the nearer connection to the respective valve plunger 41B, 42B by the same distance. A pair of preloaded compression springs 75 and 76 engage the side of the beam 74 opposite to the valves 32B and 33B, each spring 75, 76 being positioned substantially coaxially with a respective one of the valve plungers 41B and 42B and reacting against an abutment 77 on the vehicle body. A cantiliver beam 78, 79 projects laterally from the valve body 34B, 35B of each pressure reducing valve 32B, 33B in the direction that extends away from the other such valve 32B, 33B. A knife edge 82, 83 is formed at the outer end of each cantilever beam 78, 79, the distances between each knife edge 82, 83 and the axis of the nearer valve plunger 41B, 42B being the same. Each of a pair of levers 84 and 85 is fulcrumed between its ends upon a respective one of the knife edges 82 and 83. Each of the adjacent ends of the levers 84 and 85 abuts a respective one of a pair of knife edges 86 and 87 that are formed at the ends of the beam 74 by the edge of the beam 74 that is nearer to the valve bodies 34B and 35B and the outer end of each lever 84, 85 is connected by a preloaded tension spring 88, 89 to a component 91, 92 of the vehicle suspension system by which the vehicle body is supported upon the respective rear wheel 14, 15 of the vehicle so that the force that is applied to each lever 84, 85 at its outer end by the respective tension spring 88, 89 varies with relative movement between the vehicle body and the respective rear wheel 14, 15. The two levers 84 and 85 are disposed symmetrically about the longitudinal centre line of the vehicle body from which they extend laterally. The knife edge 82, 83 about which each lever 84, 85 is fulcrumed is nearer to the inner end of that lever 84, 85 that is is the outer end. Hence each lever 84, 85 applies a force to the beam 74 through the respective knife edge 86, 87 which is greater than the force that is applied to the outer end of that lever 84, 85 by the respective tension spring 88, 89.

When the vehicle is at rest upon a flat surface with the vehicle body supported upon the rear wheels 14 and 15, each of the tension springs 88 and 89 acts upon the respective lever 84, 85, the forces so exerted being equal in both magnitude and direction. Also the two compression springs 75 and 76 apply forces that are equal in magnitude and direction to the beam 74. Hence the biassing loads that act upon the valve plungers 41B and 42B of the liquid pressure reducing valves 32B and 33B are equal and each is equal to the difference between the load that is exerted upon the beam 74 by one of the coil springs 75 and 76 and the force that is applied to the respective outer end of the beam 74 by the action of one of the tension springs 88, 89 through the respective lever 84, 85. Moreover each biassing load is sufficient to hold the respective valve plunger 41B, 42B unseated.

When the rear wheels 14 and 15 on each side of the vehicle move substantially equally and in the same sense relative to the vehicle body, the two tension springs 88 and 89 are flexed equally being extended or contracted by equal amounts so that the biassing load that acts upon the respective valve plunger 41B, 42B is increased or decreased also, the beam 74 being urged laterally. The change in the biassing load upon each valve plunger 41B, 42B is greater than the change in the force exerted upon the respective lever 84, 85 by the respective tension spring 88, 89 because of the action of the respective lever 84, 85 and the biassing loads that act upon the valve plungers 41B and 42B are increased or decreased substantially equally. However the proportional change in the biassing load on each of the valve plungers 41B and 42B is substantially equal to the proportional change in the load borne by the respective wheel 14, 15 that it follows.

If the vehicle body rolls about its longitudinal centre line and there is a dynamic load transfer from the inboard rear wheel 14, 15 to the outboard rear wheel 14, 15, the outboard tension spring 88, 89 is allowed to contract so that the force it exerts upon the respective level 84, 85 is reduced, whilst the inboard tension spring 38, 89 is extended so that the force it exerts upon the respective lever 84, 85 is increased. Hence the beam 74 is loaded unequally at its ends 86 and 87 so that it pivots about its centre. Such pivotal movement of the beam 74 results in the biassing load that acts upon the valve plunger 41B, 42B of the outboard of the two liquid pressure reducing valves 32B and 33B being increased whilst the biassing load that acts upon the valve plunger 41B, 42B of the inboard of the two liquid pressure reducing valves 32B and 33B is reduced, the change in the biassing load that acts upon each valve plunger 41B, 42B being greater than the change in the force that is applied to the nearer end 86, 87 of the beam 74 by the respective lever 84, 85 because of the lever effect of such pivotal movement of the beam 74. Hence the change in the biassing load upon each valve plunger 41B, 42B that occurs when the vehicle body rolls about its longitudinal centre line so that the tension springs 88 and 89 are flexed in opposite directions by a given amount is greater than the change in the biassing load upon that valve plunger 41B, 42B that occurs when the rear wheels 14 and 15 of the vehicle move substantially equally and in the same sense relative to the vehicle body so that the tension springs 88 and 89 are flexed by said given amount in the same direction. Also the proportional change in the biassing load that acts upon each of the two valve plungers 41B and 42B is greater than the proportional change in the load that is borne by the respective wheel 14, 15 that it follows when the vehicle body rolls about its longitudinal axis whereas they are substantially equal when the rear wheels 14 and 15 move substantially equally relative to the vehicle body.

Simple liquid pressure cut-off valves which function to maintain the liquid pressure that acts in the motor cylinders to apply brakes to the rear wheels of the vehicle at the pressure at which the respective valve plunger first seats to close communication between the inlet and the outlet of the respective valve device, even though there is an increase in liquid pressure transmitted to that valve device by the driver operable brake application control device, may be used in place of the liquid pressure reducing valves that have been described above.

I claim:
1. In a vehicle having a body supported by a resilient suspension system, one rear wheel on one side of the vehicle and another rear wheel on the other side of the vehicle, one suspension component which moves with vertical movement of said one rear wheel relative to the vehicle body and another suspension component which moves with vertical movement of said other rear wheel relative to the vehicle body, a fluid pressure braking system which comprises:

a driver operable brake application control device, which provides a controlled source of fluid pressure;

one brake operative to brake said one rear wheel;

another brake operative to brake said other rear wheel;

one brake motor cylinder operative to apply said one brake;

another brake motor cylinder operative to apply said other brake;

one fluid pressure control valve connected between said driver operable device and said one brake motor cylinder, said one valve being operable to reduce the pressure supplied from said driver operable device to said one brake motor cylinder by an amount which varies with the magnitude of a biasing load applied to said one valve;

another fluid pressure control valve connected between said driver operable device and said other brake motor cylinder, said other valve being operable to reduce the pressure supplied from said driver operable device to said other brake motor cylinder by an amount which varies with the magnitude of a biasing load applied to said other valve;

one control mechanism operatively connected to said one valve and to said one suspension component, said one control mechanism including resilient means by which the magnitude of the biasing load applied to said one valve is varied with movement of said one suspension component such that any reduction in the pressure supplied to said one brake motor cylinder is proportionally greater as the load carried by said one rear wheel is reduced;

another control mechanism operatively connected to said other valve and to said other suspension component, said other control mechanism including resilient means by which the magnitude of the biasing load applied to said other valve is varied with movement of said other suspension component such that any reduction in the pressure supplied to said other brake motor cylinder is proportionally greater as the load carried by said other rear wheel is reduced;

and interconnection means interconnecting said control mechanisms such that the change in biasing load on each of said valves is greater when both rear wheels move vertically relative to the vehicle body by the same amount but in different directions that when both rear wheels move vertically relative to the vehicle body by said same amount and in the same direction.

2. A fluid pressure braking system for a vehicle according to claim 1, wherein said one control mechanism includes one torsion bar part which is connected at one end to said one suspension component, said other control mechanism includes anotther torsion bar part which is connected at one end to said other suspension component, and the interconnection means are connected to each torsion bar part at a location remote from the respective suspension component and comprises a beam and connecting means by which each torsion bar part is connected to the beam, the connecting means comprising a spaced pair of hinged joints on the beam, each torsion bar part being connected to a respective one of the spaced pair of hinged joints, and the fluid pressure control valves being orientated symmetrically with respect to the beam and each having a part which is adapted to be abutted by a respective part of the interconnecting means whereby the biasing load is applied to that valve, the arrangement being such that the two torsion bar parts are loaded angularly and substantially equally in the opposite sense when both rear wheels move vertically relative to the vehicle body by the same amount but in different directions, and the two torsion bar parts are loaded angularly substantially equally in the same sense when the rear wheels move vertically relative to the vehicle body by said same amount and in the same direction.

3. A fluid pressure braking system for a vehicle according to claim 2, wherein each torsion bar part comprises a torsion bar which is connected directly to the respective hinged joint on the beam.

4. A fluid pressure braking system according to claim 2, wherein the said part of each valve is adapted to be abutted by the beam.

5. A fluid pressure braking system for a vehicle according to claim 2, wherein the interconnecting means include a pair of intermediate levers, each torsion bar part being connected to the respective hinged joint via a respective one of the hinged levers.

6. A fluid pressure braking system for a vehicle according to claim 5, wherein the said part of each valve is adapted to be abutted by the respective intermediate lever.

7. A fluid pressure braking system for a vehicle according to claim 5, wherein the two torsion bar parts together comprise an anti-roll bar of the vehicle.

8. A fluid pressure braking system for a vehicle according to claim 7, wherein the said part of each valve is adapted to be abutted by the respective intermediate lever, and the anti-roll bar carries three spaced radial arms, a central one of the three radial arms being connected to the center of the beam and each of the other two radial arms being connected to the end of the respective intermediate lever remote from the beam, each intermediate lever being supported upon a respective fulcrum which is fixed with respect to the respective fluid pressure control valve, the said part of the respective fluid pressure control valve being adapted to engage the intermediate lever between the respective fixed fulcrum and the respective hinge connection to the beam.

9. A fluid pressure braking system for a vehicle according to claim 8, wherein each of said other radial arms is connected to the respective intermediate lever via a respective tension spring.

10. A fluid pressure braking system for a vehicle according to claim 8, wherein the central radial arm is connected to the center of the beam via a respective tension spring.

11. A fluid pressure braking system for a vehicle according to claim 1, wherein the interconnection means include a beam and the action of the resilient means of each control mechanism upon the beam is opposed by the action of at least one spring upon that beam, said at least one spring reacting against an abutment which is fixed to the vehicle body.

12. A fluid pressure braking system for a vehicle according to claim 11, wherein each such spring is a compression spring which acts upon the side of the beam opposite that to which a valve part of each said fluid pressure control valve is connected.

13. A fluid pressure braking system for a vehicle according to claim 11, wherein each fluid pressure control valve has a part which is connected to the beam, said valve parts being connected to spaced points on one side of the beam by suitable hinged connections, there being two such springs which are aligned coaxially each with a respective one of the two valve parts.

14. The braking system of claim 1 wherein the interconnection means comprises further resilient means which acts on each control mechanism to modify the load applied to each valve by the resilient means associated with each control mechanism such that when both rear wheels move vertically relative to the vehicle body by the same amount but in different directions there is no change in the load exerted by said further resilient means and when both rear wheels move vertically relative to the vehicle body by the same amount and in the same direction the change in the biasing load applied by the resilient means of each control mechanism to the respective valve is reduced by the change in the biasing load exerted by said further resilient means.

15. The braking system of claim 14 wherein the further resilient means comprises a torsion bar, one end of the torsion bar being connected to said one suspension component so as to rotate with vertical movement of said one rear wheel relative to the vehicle body and the other end of the torsion bar being connected to said other suspension component so as to rotate with vertical movement of said other rear wheel relative to the vehicle body, an arm attached to the torsion bar adjacent the mid point thereof and spring means operatively connected to said arm and to each of said control mechanisms.

16. The braking system of claim 15 wherein each control mechanism comprises an arm attached to the torsion bar adjacent the respective end thereof, a lever, adapted to apply the biasing load to the respective valve, and a spring connected between said arm and one end of the lever, said spring means being operatively connected to the other ends of the levers.

17. The braking system of claim 16 further comprising a beam, each end of the beam being pivotally connected to said other end of a respective one of the levers and said spring means being connected to the mid point of ghe beam.

18. The braking system of claim 1 wherein the interconnection means comprises a beam, one end of said beam being operatively connected to said one control mechanism and the other end of said beam being operatively connected to said other control mechanism, the valves being arranged so that the beam acts on said one valve on an axis which is intermediate the ends of the beam and nearer said one end of the beam than said other end and acts on said other valve on an axis which is intermediate the ends of the beam and is nearer said other end of the beam than said one end.

19. The braking system of claim 18 wherein spring means exert a biasing load on the beam, said biasing load on said beam being reduced by the effort applied to the ends of the beam by the control mechanisms.

* * * * *